United States Patent
Seeley

(10) Patent No.: US 11,401,701 B2
(45) Date of Patent: Aug. 2, 2022

(54) REFRIGERATION APPARATUS CONFIGURED TO CAPTURE ATMOSPHERIC WATER

(71) Applicant: WHIRLPOOL CORPORATION, Benton Harbor, MI (US)

(72) Inventor: Michael S. Seeley, South Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 153 days.

(21) Appl. No.: 16/607,476

(22) PCT Filed: Apr. 25, 2017

(86) PCT No.: PCT/US2017/029319
§ 371 (c)(1),
(2) Date: Oct. 23, 2019

(87) PCT Pub. No.: WO2018/199923
PCT Pub. Date: Nov. 1, 2018

(65) Prior Publication Data
US 2020/0141095 A1    May 7, 2020

(51) Int. Cl.
| | |
|---|---|
| E03B 3/28 | (2006.01) |
| F25B 5/04 | (2006.01) |
| F25D 17/06 | (2006.01) |
| F25D 21/14 | (2006.01) |
| F25D 23/12 | (2006.01) |
| C02F 1/00 | (2006.01) |

(52) U.S. Cl.
CPC .................. *E03B 3/28* (2013.01); *F25B 5/04* (2013.01); *F25D 17/06* (2013.01); *F25D 21/14* (2013.01); *F25D 23/126* (2013.01); *C02F 1/003* (2013.01); *F25D 2323/122* (2013.01)

(58) Field of Classification Search
CPC ... E03B 3/28; B01D 5/003; F25B 5/04; F24D 21/14; F24D 23/126
See application file for complete search history.

(56) References Cited

U.S. PATENT DOCUMENTS

| | | |
|---|---|---|
| 2,852,329 A | 9/1958 | Smith |
| 2,860,942 A | 11/1958 | Carew |
| 2,998,290 A | 8/1961 | Sharpe |
| 3,397,934 A | 8/1968 | Dushek |

(Continued)

FOREIGN PATENT DOCUMENTS

| | | |
|---|---|---|
| CN | 101162119 A | 4/2008 |
| CN | 201583096 U | 9/2010 |

(Continued)

*Primary Examiner* — Elizabeth J Martin
(74) *Attorney, Agent, or Firm* — Price Heneveld LLP

(57) ABSTRACT

A refrigeration apparatus is disclosed. The apparatus includes a storage compartment, a compressor, a condenser coupled to the compressor, and an evaporator in communication with the condenser and the compressor. The evaporator includes a first section and a second section. The first section is disposed in the storage compartment. The second section is in communication with the first section and extends outside the storage compartment. The second section is exposed to atmospheric air proximate the refrigeration apparatus.

15 Claims, 4 Drawing Sheets

(56) References Cited

U.S. PATENT DOCUMENTS

| | | | |
|---|---|---|---|
| 4,255,937 A * | 3/1981 | Ehrlich | C02F 1/325 62/264 |
| 5,220,807 A * | 6/1993 | Bourne | F25B 29/003 62/238.6 |
| 5,845,504 A * | 12/1998 | LeBleu | C02F 1/008 62/92 |
| 6,182,453 B1 | 2/2001 | Forsberg | |
| 6,550,264 B1 | 4/2003 | Cantolino | |
| 6,755,037 B2 | 6/2004 | Engel et al. | |
| 7,402,241 B2 | 7/2008 | Wright et al. | |
| 7,540,167 B2 | 6/2009 | Murphy et al. | |
| 7,578,932 B2 | 8/2009 | Cantolino | |
| 7,854,238 B2 | 12/2010 | Zatarain | |
| 8,100,488 B2 | 1/2012 | Eisele et al. | |
| 8,297,726 B2 | 10/2012 | Ramm et al. | |
| 8,814,288 B2 | 8/2014 | McDaniel et al. | |
| 2004/0040322 A1 * | 3/2004 | Engel | F24F 3/1405 62/177 |
| 2004/0195945 A1 | 10/2004 | Farber et al. | |
| 2007/0039339 A1 | 2/2007 | Lee | |
| 2008/0168791 A1 * | 7/2008 | Nebbia | F25D 23/126 62/389 |
| 2012/0023975 A1 * | 2/2012 | Yoon | F25D 21/08 62/81 |
| 2013/0088136 A1 | 4/2013 | Bassi et al. | |
| 2013/0111933 A1 * | 5/2013 | Yoon | F25D 29/003 62/89 |
| 2013/0221046 A1 | 8/2013 | Wysocki | |
| 2014/0220833 A1 | 8/2014 | Kerner | |
| 2016/0083936 A1 | 3/2016 | Martin et al. | |

FOREIGN PATENT DOCUMENTS

| | | |
|---|---|---|
| CN | 105369855 A | 3/2016 |
| DE | 3313711 A1 | 10/1984 |
| RU | 2000393 C1 | 9/1993 |

* cited by examiner

REFRIGERATION APPARATUS CONFIGURED TO CAPTURE ATMOSPHERIC WATER

FIELD

The present disclosure generally relates to refrigerated appliances, and more particularly to refrigerated appliances configured to capture atmospheric water.

BACKGROUND

Refrigerated appliances are commonly used to store perishable items. Some novel concepts related to refrigeration system and related appliances are discussed herein.

SUMMARY

According to one aspect of the present disclosure, a refrigeration apparatus is disclosed.
The apparatus comprises a storage compartment, a compressor, a condenser coupled to the compressor, and an evaporator in communication with the condenser and the compressor. The evaporator comprises a first section and a second section. The first section is disposed in the storage compartment. The second section is in communication with the first section and extends outside the storage compartment. The second section is exposed to atmospheric air proximate the refrigeration apparatus.

According to another aspect of the present disclosure, a refrigeration appliance is disclosed. The appliance comprises a storage compartment, a compressor, a condenser coupled to the compressor, and an evaporator in communication with the condenser and the compressor. The condenser comprises at least one section disposed in the storage compartment. The appliance further comprises a drain pan disposed proximate a base of the storage compartment and a reservoir. The drain pan is configured to capture condensed water condensed within the storage compartment. The reservoir is disposed in the storage compartment and in fluid communication with the drain pan. The reservoir is configured to store the condensed water communicated from the drain pan.

According to yet another aspect of the present disclosure, a refrigeration apparatus is disclosed. The apparatus comprises a storage compartment, a compressor, a condenser coupled to the compressor, and an evaporator in communication with the condenser and the compressor. The evaporator comprises a first section and a second section. The first section is disposed in the storage compartment. The second section is in communication with the first section and extends outside the storage compartment. The second section is exposed to atmospheric air proximate the refrigeration apparatus. The apparatus further comprises a collection tray disposed beneath the second section relative to gravity and a reservoir configured to store condensed moisture. The second section collects the condensed moisture from the atmospheric air via a temperature differential with the atmospheric air. The reservoir is disposed in the storage compartment and in fluid communication with the collection tray.

These and other features, advantages, and objects of the present device will be further understood and appreciated by those skilled in the art upon studying the following specification, claims, and appended drawings.

DETAILED DESCRIPTION OF EMBODIMENTS

Figure 1:
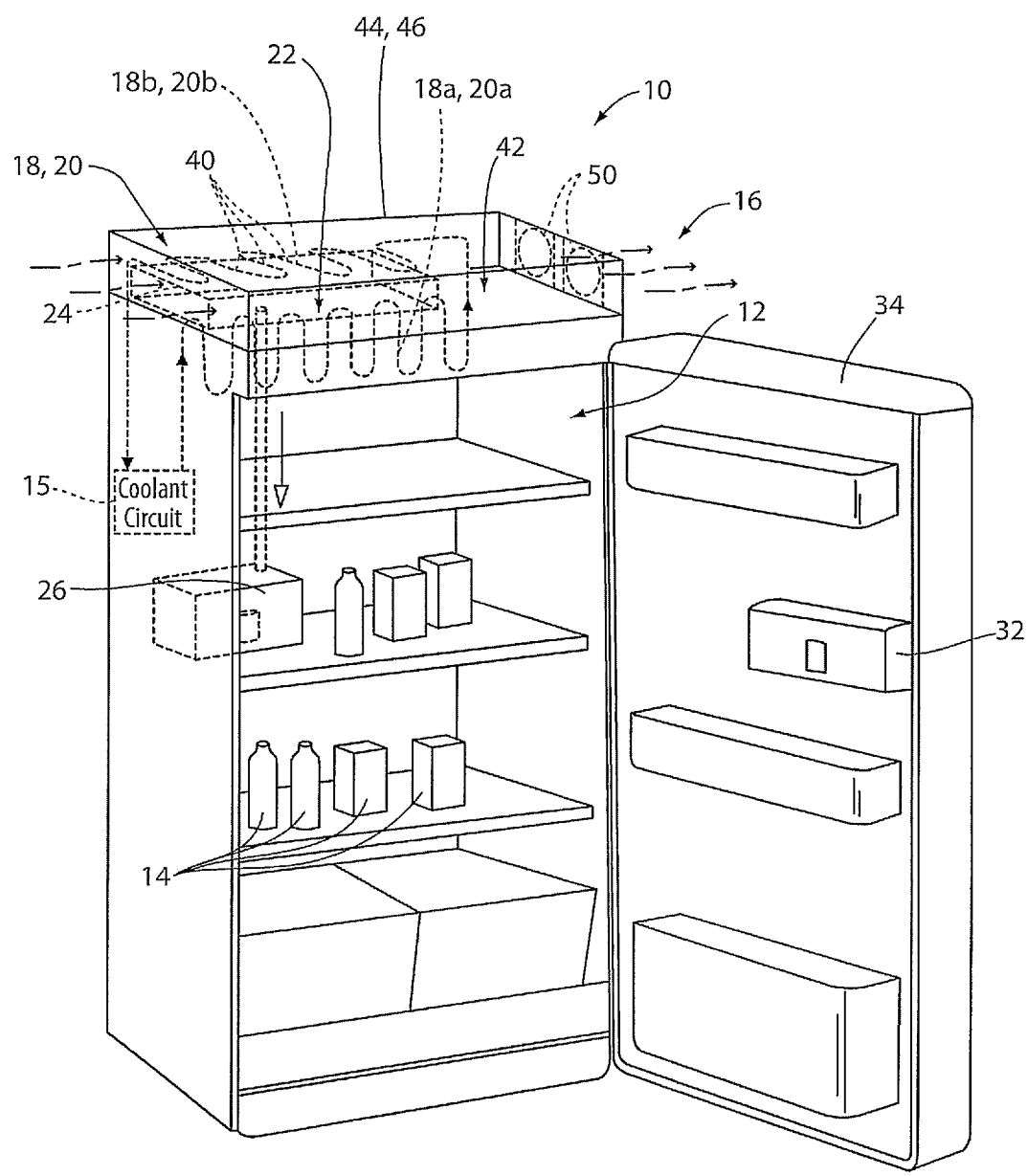
FIG. 1 is a front perspective view of a refrigeration appliance demonstrating a water collection system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIG. 1, a front perspective view of a refrigeration appliance 10 is shown. The refrigeration appliance 10 comprises a storage compartment 12, which may be configured store food goods 14 (e.g. perishable items, etc.). The appliance 10 comprises a refrigeration circuit 15 configured to circulate stored liquid coolant through the storage compartment. The chilled liquid coolant transfers heat from the storage compartment 12 such that the compartment 12 maintains a cooler temperature than ambient air temperatures proximate the appliance 10. In most applications the air proximate the appliance is atmospheric air. However, the air proximate the appliance 10 will be referred to as ambient air 16 for clarity. Accordingly, the appliance 10 may provide for advantageous cooling of food goods 14.

In various embodiments, the appliance 10 may comprise one or more features configured to extract moisture from the ambient air 16 proximate the appliance 10. Particularly in warm climates, ambient air carries moisture that can be separated by cooling the air to condense the moisture to liquid water. In order to capture the moisture in the ambient air 16, the appliance 10 may comprise an evaporator 18 having at least a portion extending outside the storage compartment 12. For example, the evaporator 18 may comprise a first section 18a disposed in the storage compartment 12 and a second section 18b extending outside the storage compartment 12, which is exposed to the ambient air 16. Though described as the first section 18a and the second section 18b, the evaporator 18 may be described as a first portion and second portion and may also be referred to as a plurality of evaporators 20. The plurality of evaporators 20 may comprise a first evaporator 20a in connection with a second evaporator 20b.

The first section 18a of the evaporator 18 may provide for heat transfer from the ambient air 16 trapped in the storage compartment 12. The second section 18b may provide for heat transfer from the ambient air 16 air proximate the appliance 10. As the ambient air 16 cools over the chilled segments or coils of the second section 18b, the moisture in the air condenses into condensed liquid 22 on the second section 18b. In order to capture the condensed liquid 22, a collection tray 24 may be disposed beneath the second section 18b. In this configuration, the condensed liquid 22 may fall from the second section 18b and into the collection tray 24. From the collection tray 24, the condensed liquid 22 may be communicated through one or more tubes or pipes to collect in a reservoir 26. The reservoir 26 may be disposed in the storage compartment 12 such that the condensed liquid 22 is chilled by the first section 18a of the evaporator 18.

In some embodiments, the reservoir 26 may comprise a spigot or access valve configured to dispense the condensed liquid 22 stored therein. The reservoir 26 may similarly be in fluid communication with a dispenser 32 configured to provide a flow of the condensed liquid to a dispensing tube. As shown in FIG. 1, the dispenser 32 is configured to pass the condensed liquid 22 through a door 34 of the storage compartment. In this configuration, the condensed liquid 22 may be pumped or otherwise dispensed through the dispensing tube via a water pump. As further discussed in reference to FIGS. 3-4, the condensed liquid 22 may be treated by one or more sanitization and/or purification processes. For example, the condensed liquid 22 may pass through a sanitization device 36 and/or an inline filter 38 prior to being dispensed and/or prior to storage in the reservoir 26. In this way, the condensed liquid 22 may be sanitized and/or filtered to ensure quality potable water is provided by the appliance 10.

As discussed herein, the evaporator 18 may correspond to one or more sections. Each of the sections 18a, 18b may comprise a plurality of overlapping segments 40 or coils. In this configuration, the heat transfer of the evaporator 18 may be controlled based on the exposed surface area of the sections 18a, 18b. Additionally, the heat transfer of the evaporator 18 may be maximized for a given volume by implementing the sections 18a, 18b in an overlapping, bent, curved, or a variety of configurations. Accordingly, the evaporator 18 may be optimized to provide a desired surface area of the first section 18a within the storage compartment 12 and the second section 18b exposed to the ambient air 16 outside the storage compartment 12.

In some embodiments, the second section 18b may extend above an upper surface 42 of the storage compartment 12 and outside the storage compartment 12. A vented housing 44 may partially enclose the second section 18b and the collection tray 24 to limit debris and/or animals from accessing a vented volume 46 or interior volume formed therein. The housing 44 may comprise vents on one or more sides of the housing 44 and in some embodiments may comprise one or more fans 50 or an air circulation device. The fans 50 may provide for a directional airflow of the ambient air 16 through the vented volume 46. In this way, the appliance 10 may circulate the ambient air 16 to maximize the moisture content and corresponding of the condensed liquid 22 condensed from the ambient air 16.

Figure 2:
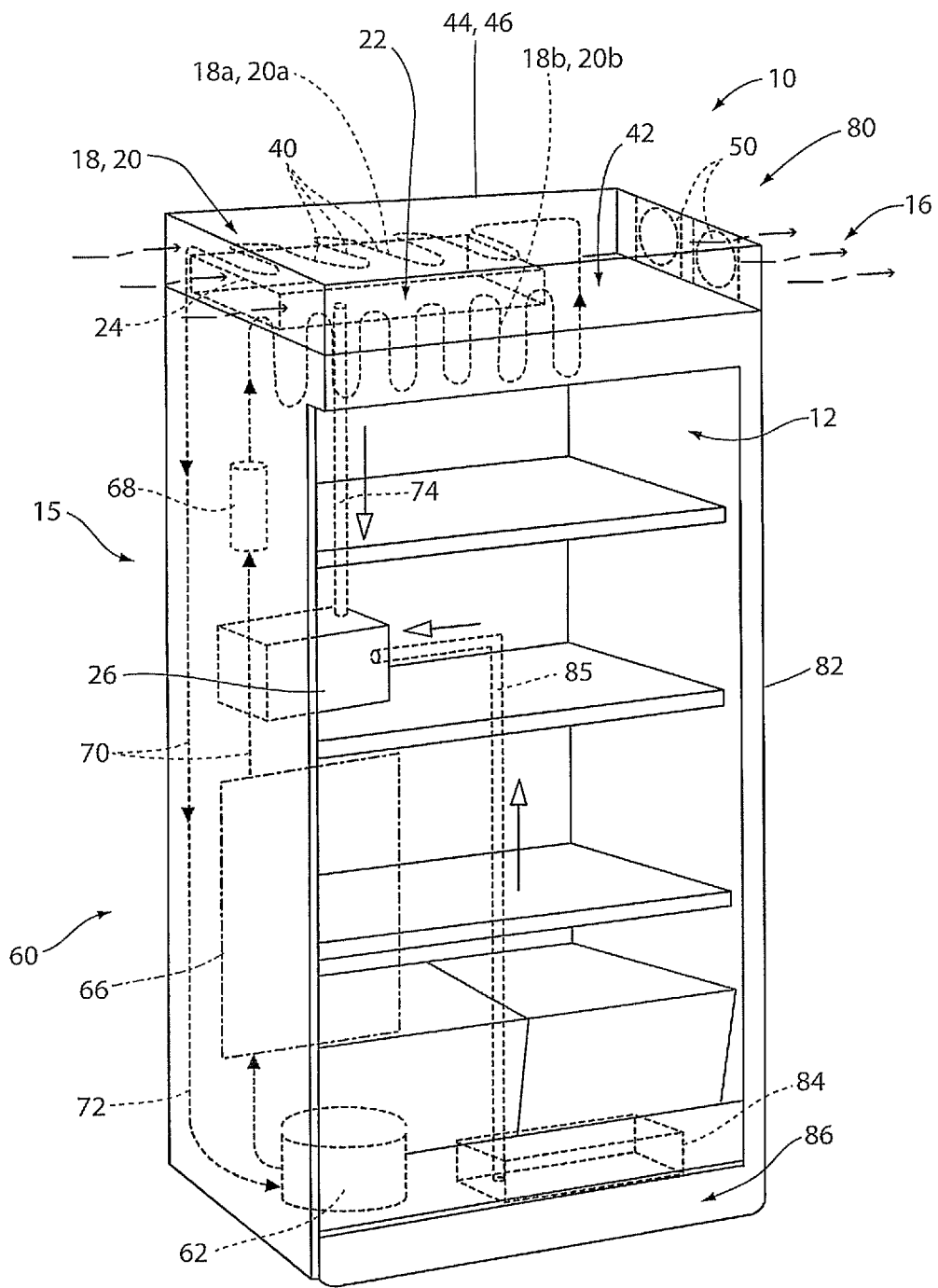
FIG. 2 is a front perspective view of a refrigeration appliance demonstrating a water collection system and a refrigeration circuit.
Figure 3:
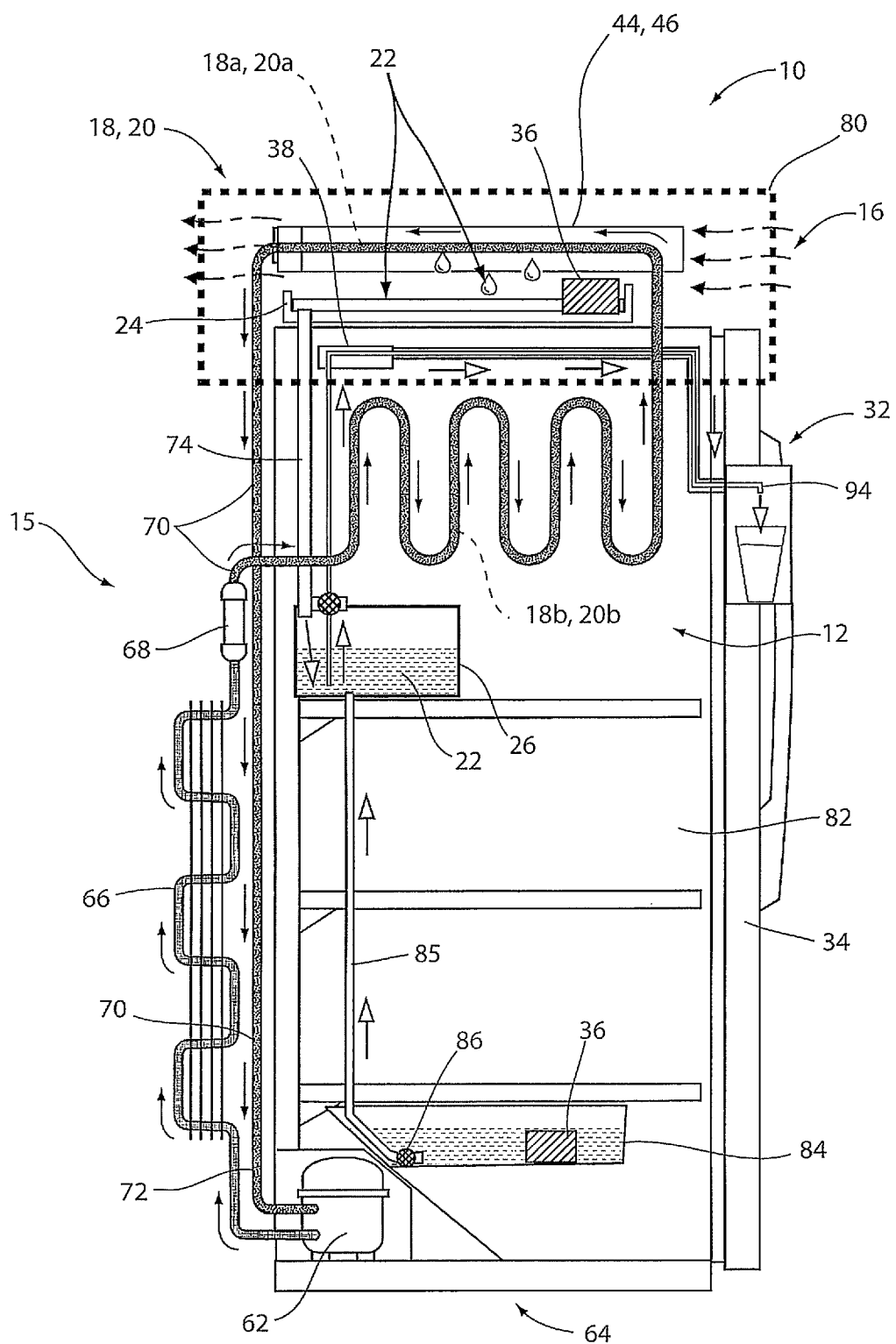
FIG. 3 is a side cross-sectional view of a refrigeration appliance comprising a water collection system.

Referring now to FIGS. 2 and 3, a perspective view and a side view of the appliance 10 are shown in greater detail demonstrating a refrigeration system 60 in connection with the refrigeration circuit 15. The refrigeration system 60 comprises a compressor 62, which may correspond to a linear compressor. Though the compressor 62 is shown located near a base 64 of the appliance 10, the compressor 62 may be located in various portions of the appliance 10. The compressor 62 is coupled to the refrigeration circuit 15. The refrigeration circuit 15 comprises a condenser 66, an expansion valve 68, and the evaporator 18, which may be interconnected via a conduit 70. In this configuration, refrigerant may flow from the compressor 62 into the condenser 66, through the expansion valve 68 and the evaporator 18, and return to the compressor 62 via a suction line 72.

As disclosed, the refrigerant may enter the evaporator 18 through the conduit 70 and transfer heat from the storage compartment 12. The first section 18a of the evaporator 18 may provide for heat transfer from the air trapped in the storage compartment 12. The second section 18b may provide for heat transfer from the ambient air 16 air proximate the appliance 10. As the ambient air 16 cools over the chilled segments or coils of the second section 18b, the moisture in the air condenses into condensed liquid 22 on the second section 18b. The condensed liquid 22 may fall into the collection tray 24 disposed beneath the second section 18b. From the collection tray 24, the condensed liquid 22 may be communicated through a first collection conduit 74 to accumulate in the reservoir 26. As illustrated, the reservoir 26 is shown disposed in the storage compartment 12 such that the condensed liquid 22 is chilled by the first section 18a of the evaporator 18.

The second section 18b of the evaporator 18, the collection tray 24, the fan 50, and the vented housing 44 may form an atmospheric water collection device 80. Though demonstrated positioned above the upper surface 42 of the storage compartment 12, the atmospheric water collection device 80 may be connected to a sidewall 82, the door 34 or various portions of the appliance 10. Accordingly, the atmospheric water collection device 80 may comprise the second section 18b positioned in various configurations outside the storage compartment 12. Though discussed as being contained in the vented housing 44, the second section 18b may be open to the ambient air 16. Additionally, the one or more fans 50 may be omitted depending on a desired design. Accordingly, the disclosure provides for a variety embodiments to suit various applications of the appliance 10.

In addition to the condensed liquid 22 captured in the collection tray 24, the appliance 10 may further provide for the capture of condensed liquid 22 in a drain pan 84. The drain pan 84 may be disposed near the base 64 of the appliance 10 proximate a bottom surface of the storage compartment 12. As discussed, a portion of the ambient air 16 may become trapped in the storage compartment 12. Similar to the moisture condensed on the second section 18b, the condensed liquid 22 may form on the first section 18a and/or various interior surfaces of the storage compartment 12 and the door 34. The condensed liquid 22 in the storage compartment 12 may fall into the drain pan 84. The condensed liquid 22 in the drain pan 84 may be transferred by a pump 86 to the reservoir 26. In this way, the condensed liquid 22 may be communicated through a second collection conduit 85 to accumulate in the reservoir 26.

The pump 86 may correspond to a variety of forms of water pumps and may be disposed in the drain pan 84. The pump 86 may correspond to a reciprocating pump, positive displacement, screw pump, or any suitable pump that may transfer the condensed liquid 22 from the drain pan 84 to the reservoir 26. Though specific types of devices are discussed herein to support the disclosure, similar devices and configurations that may be considered equivalents by those skilled in the art may be applied without departing from the spirit of the disclosure. Accordingly, the scope of the disclosure should not be limited by any descriptive aspects of the specification unless expressly stated in the claims.

Figure 4:
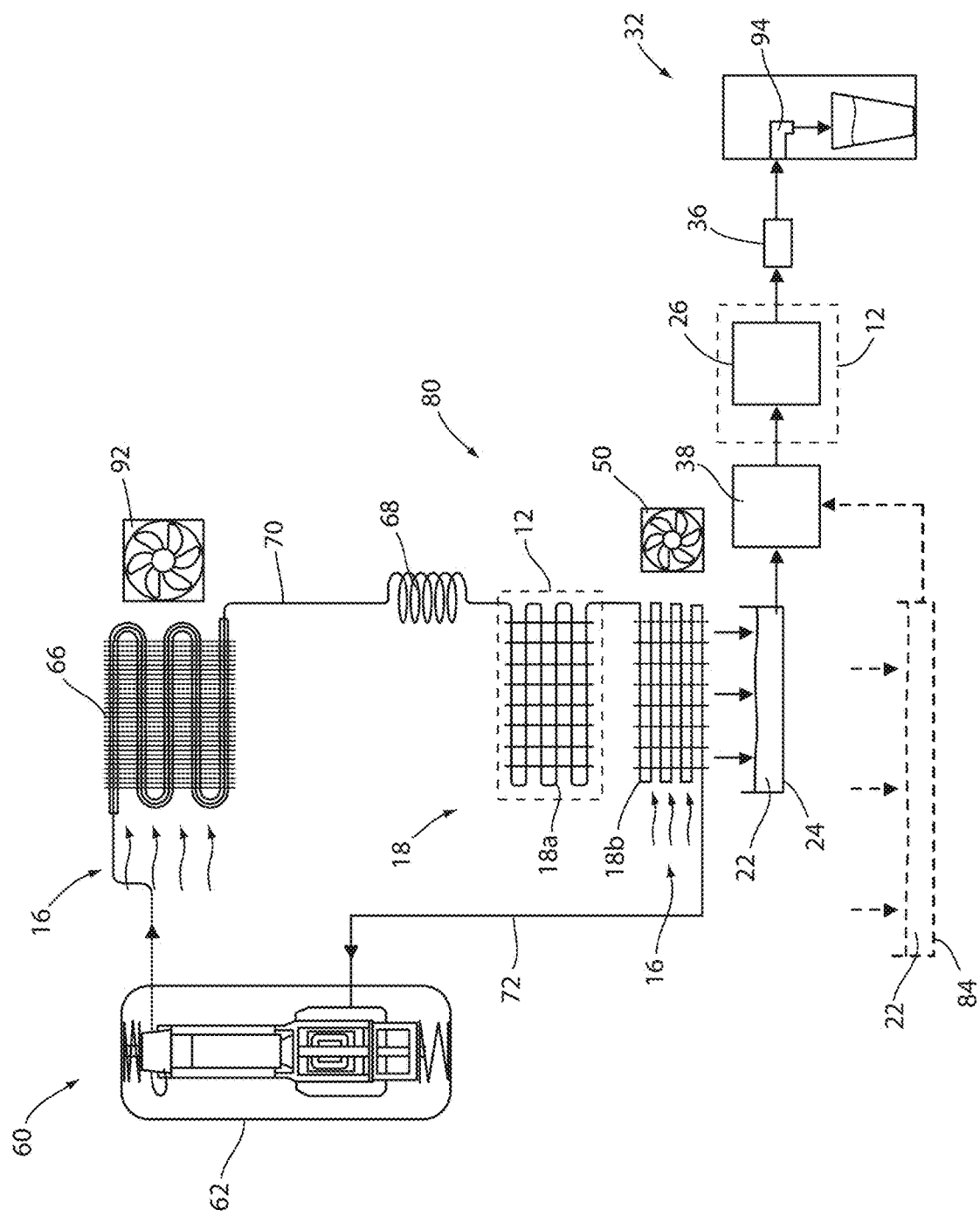
FIG. 4 is an operational block diagram of a refrigeration appliance comprising a water collection system in accordance with the disclosure.

FIG. 4 demonstrates a functional block diagram of the refrigeration system 60 and the atmospheric water collection device 80. Referring now to FIGS. 3 and 4, the refrigeration system 60 is shown comprising the compressor 62, condenser 66, expansion valve 68, and the evaporator 18 including the first section 18a and the second section 18b. The compressor 62 is coupled to the refrigeration circuit 15 interconnected by the conduit 70. In this configuration, refrigerant may flow from the compressor 62 into the condenser 66, through the expansion valve 68 and the evaporator 18, and return to the compressor 62 via the suction line 72. In addition to the components already discussed herein, the refrigeration system 60 may further comprise a condenser fan 92 to provide for improved thermal transfer.

The first section 18a of the evaporator 18 is shown outlined by a broken line demonstrating that the first section 18a is disposed in the storage compartment 12. Additionally, the reservoir 26 is shown outlined indicating that the reservoir 26 may also be housed or disposed within the storage compartment 12. However, in various embodiments, the reservoir 26 may be disposed outside the storage compartment 12. In this way, the appliance 10 may be flexibly configured to suit a variety of applications.

The second section 18b may provide for heat transfer from the ambient air 16 proximate the appliance 10. The ambient air 16 may be circulated over the second section 18b via the one or more fans 50. The ambient air 16 passing over the chilled segments or coils of the second section 18b causes the condensed liquid 22 to form and gather in the collection tray 24. Additionally, the condensed liquid 22 from the ambient air 16 trapped in the storage compartment 12 may gather in the drain pan 84. The condensed liquid 22 may be pumped or directed into the sanitization device 36 and/or an inline filter 38 prior to being dispensed and/or prior to storage in the reservoir 26. In this way, the condensed liquid 22 may be sanitized and/or filtered to ensure quality potable water it provided by the appliance 10.

The sanitization device 36 may correspond to various forms of sanitization devices. For example, the sanitization device 36 may utilize a variety of sanitization techniques including but not limited to boiling distillation, ozone distillation, ultraviolet (UV) sanitization, etc. Accordingly, the sanitization device 36 may be implemented by various devices to ensure that the water is potable. The inline filter 38 may correspond to a particle filter or a variety of types of filters. For example, the filter 38 may correspond to a carbon or charcoal filter, iodine crystals, and membrane filters. In this way, the condensed liquid 22 (e.g. condensed water) may be filtered and purified to ensure that clean, potable water may be dispensed from the dispensing tube 94 of the dispenser 32.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigeration apparatus comprising:
    a storage compartment;
    a refrigeration circuit configured to cool the storage compartment, the refrigeration circuit comprising:
        a compressor that communicates a flow of refrigerant through the refrigeration circuit;
        a condenser coupled to the compressor that receives the refrigerant from the compressor; and
        an evaporator in communication with the condenser and the compressor, wherein the evaporator receives the refrigerant and returns the refrigerant to the compressor, wherein the evaporator comprises:
            a first section disposed in the storage compartment that refrigerates the storage compartment; and
            a second section in communication with the first section that extends outside the storage compartment, wherein the second section extends above the first section outside the storage compartment in a vented housing in connection with an upper surface of the refrigeration apparatus and the second section is exposed to atmospheric air proximate the refrigeration apparatus.

2. The apparatus according to claim 1, wherein the first section comprises a first plurality of evaporator coils cooling an interior volume formed by the storage compartment.

3. The apparatus according to claim 2, wherein the second section comprises a second plurality of evaporator coils exposed outside the storage compartment.

4. The apparatus according to claim 1, further comprising a collection tray disposed beneath the second section.

5. The apparatus according to claim 4, wherein the second section condenses moisture from the atmospheric air via a temperature differential with the atmospheric air.

6. The apparatus according to claim 4, wherein the collection tray is configured to capture the condensed moisture.

7. The apparatus according to claim 4, further comprising a reservoir disposed inside the storage compartment in fluid communication with the collection tray and configured to store the condensed moisture extracted from the atmospheric air wherein the condensed moisture is chilled by the first section of the evaporator.

8. The apparatus according to claim 1, wherein the storage compartment is refrigerated by the first section of the evaporator.

9. The apparatus according to claim 1, wherein the vented housing comprises at least one fan configured to circulate the atmospheric air through an interior volume of the vented housing containing the second section.

10. A refrigeration appliance comprising:
    a storage compartment;
    a compressor;
    a condenser coupled to the compressor;
    an evaporator in communication with the condenser and the compressor, wherein the evaporator comprises a first section and a second section, the first section disposed in the storage compartment and the second section in communication with the first section, wherein the second section extends outside and above the storage compartment in a vented housing in connection with an upper surface of the refrigeration appliance and is exposed to atmospheric air proximate the refrigeration appliance, and wherein the second section collects the condensed moisture from the atmospheric air via a temperature differential with the atmospheric air;
    a drain pan disposed proximate a base of the storage compartment, wherein the drain pan is configured to capture condensed water condensed within the storage compartment; and
    a reservoir disposed in the storage compartment and in fluid communication with the drain pan, wherein the reservoir is configured to store the condensed water communicated from the drain pan.

11. The appliance according to claim 10, further comprising:
    a sanitization device configured to sanitize the condensed water from the drain pan prior to communication of the condensed water into the reservoir.

12. The apparatus according to claim 10, further comprising a collection tray disposed beneath the second section and in fluid communication with the reservoir.

13. The apparatus according to claim 12, wherein the collection tray receives the condensed moisture and communicates the condensed moisture into the reservoir.

14. A refrigeration apparatus comprising:
    a storage compartment;
    a compressor;
    a condenser coupled to the compressor;
    an evaporator in communication with the condenser and the compressor, wherein the evaporator comprises a first section and a second section, the first section disposed in the storage compartment, the second section in communication with the first section and extending outside the storage compartment, wherein the second section extends outside and above the storage compartment in a vented housing in connection with an upper surface of the refrigeration appliance and is exposed to atmospheric air proximate the refrigeration apparatus;
    a collection tray disposed beneath the second section, wherein the second section collects condensed moisture from the atmospheric air via a temperature differential with the atmospheric air; and
    a reservoir disposed in the storage compartment and in fluid communication with the collection tray, wherein the reservoir is configured to store the condensed water communicated from the collection tray.

15. The apparatus according to claim 14, further comprising a sanitization device in fluid communication with the collection tray, wherein the sanitization device is configured to treat the condensed water prior to communication to the reservoir.

* * * * *